United States Patent
Shah et al.

(10) Patent No.: US 6,444,153 B1
(45) Date of Patent: Sep. 3, 2002

(54) IN-LINE COMPOUNDING/EXTRUSION DEPOSITION AND MOLDING APPARATUS AND METHOD OF USING THE SAME

(75) Inventors: Suresh Deepchand Shah, Troy; Jason Alan Waite, Lake Orion, both of MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/473,279

(22) Filed: Dec. 28, 1999

(51) Int. Cl.$^7$ .............................................. B29C 47/38
(52) U.S. Cl. ................................ 264/211.21; 264/322
(58) Field of Search ..................... 264/211.21, 211.22, 264/171.11, 210.2, 322; 425/114, 113, 121, 126.1

(56) References Cited

U.S. PATENT DOCUMENTS

| | | | | |
|---|---|---|---|---|
| 4,925,381 A | * | 5/1990 | Aoki et al. | |
| 5,000,397 A | * | 3/1991 | Darrieux | |
| 5,185,117 A | * | 2/1993 | Hawley | |
| 5,358,680 A | * | 10/1994 | Boissonnat et al. | |
| 5,401,154 A | * | 3/1995 | Sargent | |
| 6,126,433 A | * | 10/2000 | Svoboda | |
| 6,186,769 B1 | * | 2/2001 | Hawley | |
| 6,190,586 B1 | * | 2/2001 | Abrams et al. | |

* cited by examiner

*Primary Examiner*—Mark Eashoo
(74) *Attorney, Agent, or Firm*—Kathryn A. Marra

(57) ABSTRACT

According to the present invention an in-line compounding/extrusion deposition and molding apparatus and method of using the same are provided. The apparatus comprises a single step compounding and extrusion apparatus which includes an extruder screw. The apparatus includes a first zone, a second zone, and a third zone. The first zone is used to melt an inlet material before the screw advances the melted inlet material into the second zone which comprises a preparation and cutting zone. Simultaneously, as the inlet material is melted in the first zone, the screw rotation feeds a reinforcing fiber bundle into the second zone where the reinforcing fiber bundle is prepared for melt impregnation and is sheared to a desired length. While in the second zone, mixing begins between the melted inlet material and the sheared reinforcing fiber bundle. Next the mixture is advanced into the third zone for uniform distributive mixing and impregnation of the sheared reinforcing fiber bundle with the melted inlet material to form a fiber bundle filled melt. The apparatus includes at least one winding/unwinding reel which continuously ensures that the reinforcing fiber bundle is under constant tension (no sagging or breaking thereof) during the X, Y, Z movement of the apparatus during melt deposition as well as during forward movement of the screw within the barrel.

16 Claims, 5 Drawing Sheets

IN-LINE COMPOUNDING/EXTRUSION DEPOSITION AND MOLDING APPARATUS AND METHOD OF USING THE SAME

TECHNICAL FIELD

The present invention relates generally to an apparatus and method of manufacturing a resin structure reinforced with long fibers and, more particularly, to an apparatus and method of manufacturing for a single-step in-line compounding of a reinforcing fiber with extrusion compression molding.

BACKGROUND OF THE INVENTION

Elongated resin structures reinforced with fibers in which thermoplastic resins are reinforced with continuous fibers have mechanical properties superior to those structures reinforced with short fibers. Such structures are beneficial because they can be cut and formed into pellets or similar materials. Elongated thermoplastic resin structures reinforced with fibers are generally manufactured by the so-called pultrusion method by impregnating a thermoplastic resin into a continuous reinforcement fiber bundle while the bundle is passed through a cross-head extrusion die, after which the resin-impregnated fiber bundle is drawn out through a die. After undergoing the pultrusion method, the structures are cut to a desired size.

Other processes are used to produce elongated thermoplastic resin structures reinforced with fiber, for example, where first the plastic is melted in a long single screw extruder which is fed to another single screw extruder. Next chopped strands are fed into the melt, and the reinforcing fiber melt is pumped into an accumulator after which the required log size is cut and fed into a vertical molding press.

Currently, there is no apparatus available employing a single-step process that utilizes a single screw extruder as a reinforcing fiber compounder and melt deposition unit. Likewise, there is no method currently available where reinforcing fibers are fed into a barrel of the apparatus such that the fibers are constantly maintained in a stretched condition regardless of the movement of the apparatus, thereby eliminating the possibility of fiber entanglement.

SUMMARY OF THE INVENTION

It is, therefore desirable to provide an apparatus and process for in-line compounding of reinforcing fiber and molding in a single-step process. A reinforcing product is compounded by use of a reciprocating single screw extruder having a reinforcing fiber compounder and a melt depositing unit, where the reinforcing fibers are severed at a maximum desirable length and kept in a stretched tensioned condition regardless of the apparatus positioning such that there are no loose or sagging fibers during the process.

Advantageously, the in-line compounding/extrusion apparatus of the present invention allows for the in-line compounding of reinforcing fibers with extrusion compression molding in a single step by utilizing a reciprocating single screw injection unit. Typically, the in-line compounding of reinforcing fibers with extrusion compression molding would involve high cost, bulky equipment consisting of combinations of single screw, twin screw and plunger deposition assemblies. By using a single-step process for the in-line compounding of reinforcing fibers and extrusion compression molding, the present invention offers a more cost effective method of producing a higher quality part.

In accordance with the preferred embodiment of the present invention, there is provided a method to incorporate the continuous reinforcing fiber into the reciprocating single screw injection unit and to sever and uniformly impregnate the fine filaments with resin keeping maximum fiber length in the part.

In accordance with another aspect of the preferred embodiment of the present invention the apparatus includes winding/unwinding reels and guides which prevent the reinforcing fibers from sagging and breaking during a melt deposition step or during forward and rear movement of the reciprocating single screw injection unit.

The above and other objects and advantages of the invention will be apparent from the following description, the accompanying drawings and the appended claims.

BRIEF DESCRIPTION OF THE DRAWINGS

Referring now to the drawings wherein like elements are numbered alike in the several Figures.

DETAILED DESCRIPTION OF THE PREFERRED EMBODIMENT

Figure 1:
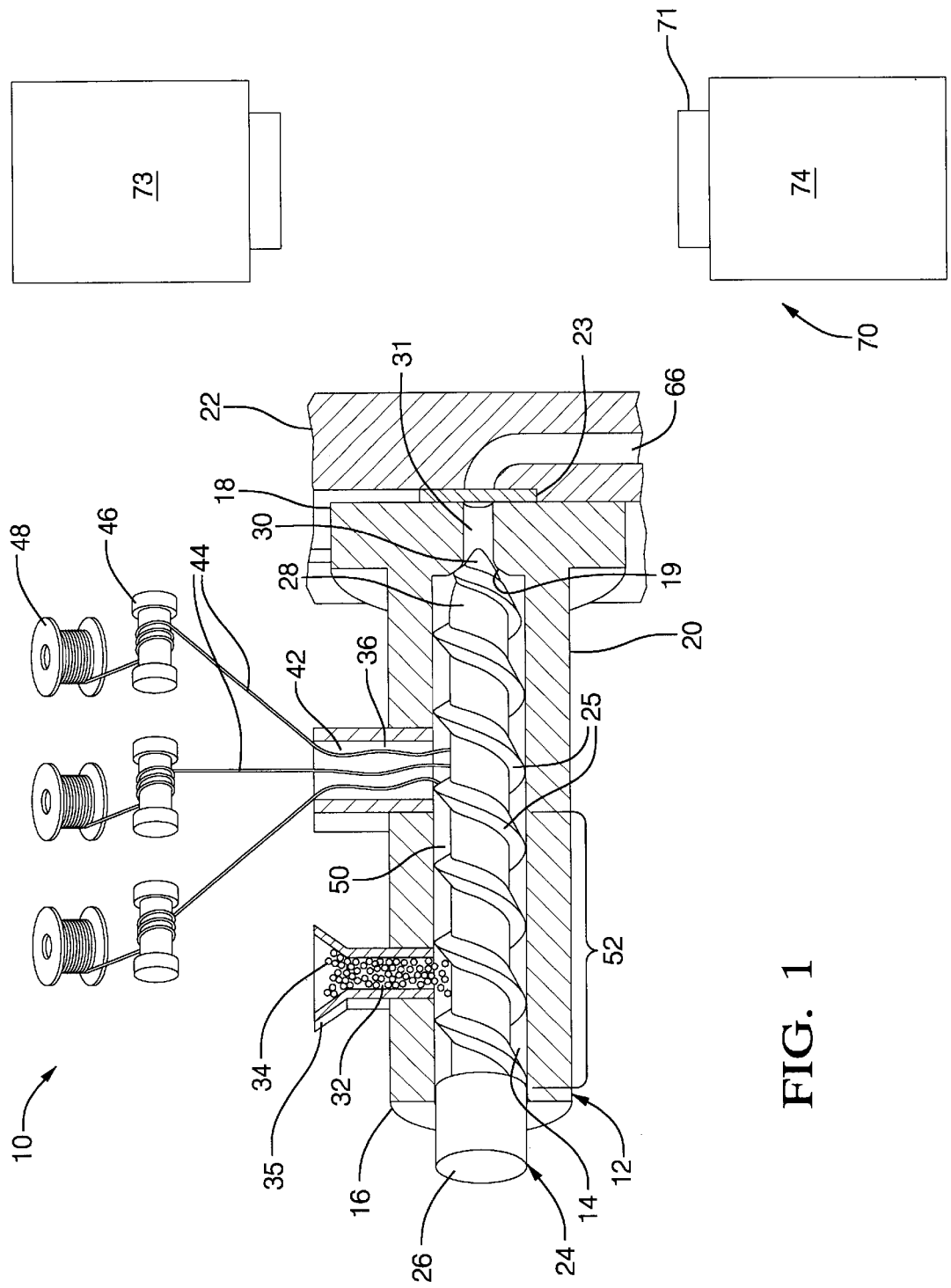
FIG. 1 is a cross-sectional side elevational view of one embodiment of an apparatus of the present invention in a first position.

A typical embodiment of an in-line compounding/extrusion apparatus 10 embodying the present invention is shown in FIGS. 1–5. The apparatus 10 has a barrel 12 which in a preferred embodiment is cylindrical in shape. It will be appreciated that barrel 12 may have other shapes. Barrel 12 includes an internal cavity 14 formed therein and extending along a longitudinal axis thereof. The barrel 12 has a first end 16, an opposite second end 18 and an outer surface 20. The internal cavity 14 extends from the first end 16 to the second end 18 of the barrel 12. Located at the second end 18 of the barrel 12 is-a die 22 including a blade 23 that opens and closes during operation of the apparatus 10 wherein the blade 23 is initially closed. The internal cavity 14 is preferably cylindrical in shape and has a diameter great enough to permit a screw 24 to be disposed therein. In the preferred embodiment, the screw 24 is sized to fit tightly in the internal cavity 14. In other words, the widest diameter of the screw 24 is slightly less than the inner diameter of the internal cavity 14. The barrel 12 preferably includes a beveled portion 19 which comprises an annular beveled surface which has a complementary shape as the head 30 so that the beveled portion 19 acts as a stop for the screw 24 as the screw 24 is driven in a direction towards the second end 18. Beveled portion 19 includes and defines a central opening 31.

The screw 24 includes a first end 26 and an opposing second end 28. A head 30 is provided at the second end 28 of the screw 24. When the screw 24 is inserted into the internal cavity 14 of the barrel 12, the head 30 is inserted into the internal cavity 14 at the first end 16 of the barrel 12 and is advanced therein towards the opposing second end 18. The apparatus 10 further has a die 22 that is in selective fluid communication with the internal cavity 14 at the second end 18 of the barrel 12. The blade 23 is designed to provide the selective fluid communication between the internal cavity 14 and the die 22 so that in the closed position shown in FIGS. 1 and 2, the screw 24 is prevented from advancing material into the die 22. As a result, material disposed within the internal cavity 14 of the barrel 12 is prevented from freely entering or communicating with the die 22. As is known in the extruding art, the screw 24 has a plurality of flights 25 which are designed to advance the material through the internal cavity 14 as the screw 24 rotates and the material is picked-up and advanced forward by the plurality of flights 25.

Apparatus 10 also includes a first inlet 32 which is in communication with the barrel 12 and more specifically with the internal cavity 14. The exemplary first inlet 32 comprises a bore extending from the outer surface 20 of the barrel 12 and is generally perpendicular to the longitudinal axis of the barrel 12. The first inlet 32 opens into the internal cavity 14 so that an inlet material 34 may be introduced thereto from outside of the apparatus 10. In the exemplary illustrated embodiment, the first inlet 32 is preferably cylindrical in shape. It being understood that the first inlet 32 may have other cross-sectional shapes. The diameter of the first inlet 32 is of a sufficient dimension to permit the inlet material 34 to be introduced therethrough into the internal cavity 14. As the inlet material 34 enters the internal cavity 14, the screw 24 is designed to have the greatest flight depth so as to assure easy entry of the inlet material 34 and its conveyance forward under a high positive pressure. As the inlet material 34 is introduced into the internal cavity 14, it contacts the screw 24 and is disposed therearound and between the plurality of flights 25 which serves to advance the inlet material 34 once the screw 24 is rotated.

The apparatus 10 further includes a second inlet 36. Similar to the first inlet 32, the second inlet 36 comprises a bore extending from the outer surface 20 of the barrel 12. The second inlet 36 is generally perpendicular to the longitudinal axis of the barrel 12. The second inlet 36 opens into the internal cavity 14 so that material may be introduced thereto from outside of the apparatus 10. In the exemplary illustrated embodiment, the second inlet 36 is preferably cylindrical in shape. The second inlet 36 is positioned intermediate the first inlet 34 and the second end 18 of the barrel 12 and each respective axis of the first and second inlets 34, 36 are substantially parallel to one another. In the preferred embodiment, the second inlet 36 is cylindrical in shape; however, as can be appreciated, other shapes can be utilized. The first inlet 32 is thus closer to the first end 16 of the barrel 12 than the second inlet 36.

The first inlet 32 is designed to fit a hopper 35. The hopper 35 comprises a funnel-like holder capable of holding the inlet material 34. The inlet material 34 being fed into the internal cavity 14 through the first inlet 32 includes but is not limited to suitable thermoplastics and thermoset compounds. In one exemplary embodiment, the inlet material 34 comprises a quantity of plastic pellets which are fed through the hopper 35 and first inlet 32 into the internal cavity 14. The inlet material 34 is melted prior to further processing, wherein the melting is accomplished by maintaining a predetermined compression ratio of the screw 24 as the inlet material 34, e.g., plastic pellets, is advanced forward within the internal cavity 14 by the plurality of flights 25. As is known in the art, another method of describing the screw 24 is in terms of compression ratio. The compression ratio is generally defined as a comparison of the channel depth in the first flight of the first zone (feeding zone) and the channel depth of the last flight in the first zone (feeding zone). The channel depth (flight depth) is the distance from the outer edge of a flight 25 to the outer surface of the screw 24. The screw 24 is designed so that as the inlet material 34 enters the internal cavity 14 through the first inlet 32, the depth of the plurality of flights 25 of the screw 24 is decreased. By decreasing the depth of the plurality of flights 25, the compression ratio is increased. Between the first and second inlets 32, 36 the depth of flights 25 transition quickly form a deep flight depth to a shallow flight depth. The flight depth should be deep enough to create a compression ratio greater than about 3.5:1 in the first zone. In an exemplary embodiment, the compression ratio is preferably about 8:1 to aid in the rapid melting of the incoming inlet material 34 before it reaches the next second inlet 36.

The second inlet 36 preferably includes a reinforcing fiber guide 42. The guide 42 comprises any number of guides which are designed to separate individual reinforcing fiber bundles 44 from one another so that the individual reinforcing fiber bundles 44 do not become entangled with one another as they are fed into the internal cavity 14. It being understood that the reinforcing fibers are commonly provided in reinforcing fiber bundles 44 which are then fed into the apparatus 10. An individual reinforcing fiber bundle 44 is also commonly refered to as a roving which comprises of a number of fibers with defined diameters and special sizing. For example, the second inlet 36 may be formed so that the guide 42 comprises at least one bore formed in and extending through the second inlet 36, wherein one reinforcing fiber bundle 44 is received within one bore. Each reinforcing fiber bundle 44 is formed of any suitable number of reinforcing fibers including but not limited to glass fibers, natural fibers, polyaramid fibers (e.g., Kevlar fibers commercially available from DuPont), carbon fibers or the like. Each reinforcing fiber bundle 44 is fed into the guide 42 from at least one winding/unwinding reel 46. The preferred embodiment is shown with three (3) winding/unwinding reels 46 for three (3) reinforcing fiber bundles 44; however as few as one (1) and as many as desired can be utilized in the present invention. The guide 42 is useful in directing the reinforcing fiber bundles 44 into the proper location in the internal cavity 14 and works in conjunction with the winding/unwinding reels 46 to keep the reinforcing fiber bundle 44 in a constant taut state. In the exemplary embodiment shown, the guide 42 comprises a rotatable member having a plurality of grooves formed therein for separating individual reinforcing fiber bundles 44 from one another so that the individual fiber bundles 44 do not become entangled during the feeding process.

The winding/unwinding reels 46 are preferably located above the guide 42 and are fed from an equal number of spools 48 containing the reinforcing fiber bundles 44. While the exemplary embodiment shows the spools 48 as having a round shape, it is understood that the other shapes may be used. There is one spool 48 feeding each winding/unwinding reel 46. The movement of the apparatus 10 and the screw 24 sets in motion the winding/unwinding of the reinforcing fiber bundles 44 on the reels 46. When the reinforcing fiber bundles 44 are unwound from the reels 46, the rotation of the screw 24 results in the feeding of the reinforcing fiber bundles 44 into the guide 42 and thus into the internal cavity 14 of the barrel 12 as well as the simultaneous plastication of the inlet material 34 which is introduced through the first inlet 32. The unwinding of the reinforcing fiber bundles 44 from the winding/unwinding reels 46 results in the accompanying unwinding from the associated spools 48. When the process is reversed, the reels 46 are wound as are the connected spools 48 so as not to allow for any slack in the reinforcing fiber bundles 44. Thus, the reinforcing fiber bundles 44 are consistently under tension regardless of the positioning of the apparatus 10.

The internal cavity 14 of the barrel 12 is precisely sized to fit the screw 24 and allow a very narrow gap 50 to exist between the outer diameter of the screw 24 and the diameter of the internal cavity 14 of the barrel 12. The screw 24 has a preselected diameter (D) and length (L) such that L/D is large up to 35:1. Preferably the L/D ratio could be in the range of 20:1 to 35:1. It is generally known that the higher the L/D ratio, the higher will be the surface available for shearing, mixing, and plasticating the inlet material 34. Throughout operation the screw 24 will be free to rotate through the internal cavity 14, additionally the screw 24 is preset with back pressure allowing for the retraction (or movement away from the second end 18 of the barrel 12) of the screw 24 once an accumulation of material forms in front of the screw 24. The front of the screw 24 is defined as that area between the head 30 of the screw 24 and the blade 23 when it is in a closed position. This is known as "shot size".

The length of the barrel 12 is generally divided into at least three (3) zones, namely a first zone 52, a second zone 56, and a third zone 62. Each of the zones 52, 56, 62 performs an operation useful in the compounding/extrusion process as will be described in greater detail hereinafter. The first zone or a melting zone 52 is created as the inlet material 34 is fed into the first inlet 32 under compression to form a melted plastic. The screw 24 design in this area has a deep flight depth to create a high compression ratio so that the inlet material 34 rapidly melts as the inlet material 34 is introduced and advanced through the first zone 52. However, the flight depth in the first zone 52 reduces sharply from the beginning to the end of the zone. As the melted inlet material 34 leaves the first zone 52, it enters a second zone or a preparation and cutting zone 56. Thus, the first zone 52 serves to melt the inlet material 34 for further processing in the apparatus 10. It being understood that the relative size of each of the zones 52, 56, and 62 has been illustrated for purpose of illustration and clarity only and it is within the scope of the present invention that the lengths of these zones 52, 56, and 62 differ depending upon the application as is known in the art.

The second zone 56 is established to prepare the reinforcing fiber bundles 44 for shearing and impregnation as they are introduced into the apparatus 10 and more specifically the internal cavity 14. The screw 24 design in this second zone 56 has a deep flight depth however the flight depth throughout the second zone 56 remains constant so that there is zero compression in the second zone 56. In other words, the compression ratio is zero because there is no change in the depth of the flights 25 in the second zone 54. The actual screw flight depth depends on the number of reinforcing fiber bundles 44 fed into the second zone 56 and the type of the inlet material 34 used. A deep flight depth is necessary in the second zone 56 so as to accommodate a larger volume of reinforcing fiber bundles 44. The flight depth should be as high as possible based on the structural integrity of the screw 24 which is dependant on the screw diameter. As the reinforcing fiber bundles 44 pass from the guide 42 into the internal cavity 14, the filaments of each of the reinforcing fiber bundles 44 are opened for proper melt impregnation. That is the filaments of the reinforcing fiber bundles 44 are opened for better wetting so that each filament can be coated with the melted inlet material 34. It is also understood that the may pre-heat the reinforcing fiber bundles 44 after the reinforcing fiber bundles 44 pass the winding/unwinding reels 46 but prior to entrance into the second inlet 36. This results in increased wettability of the individual reinforcing fiber bundles 44 with the melted inlet material 34.

In the second zone 56, the reinforcing fiber bundles 44 are sheared or broken to a desirable longer length. The shearing is accomplished as the tensile load on the reinforcing fiber bundles 44 is increased so that each of the reinforcing fiber bundles 44 shears in approximately the same length. As the reinforcing fiber bundles 44 move through the second zone 56, the resistance on the reinforcing fiber bundles 44 increases so that when the resistance becomes too great, the reinforcing fiber bundles 44 are sheared or broken forming individual sheared reinforcing fibers 60.

Upon exiting the second zone 56, the sheared reinforcing fibers 60 exit along with the melted inlet material 34 and the further mixing begins. The third zone 62 comprises a mixing and impregnation zone for further mixing of the melted inlet material 34 and the sheared reinforcing fibers 60. The continued mixing and impregnation result in a fiber filled melt being produced. The fiber filled melt is generally indicated at 64 in the Figures.

The apparatus 10 further includes an outlet 66 formed in the die 22 which serves as an exit for the fiber filled melt 64 from the die 22 after the fiber filled melt 64 travels from the barrel 12 to the die 22. The outlet 66 preferably extends from the die 22 in a direction perpendicular to the longitudinal axis of the die 22 and continues through the die 22 before reaching an outer surface of the die 22. In the preferred embodiment, the outlet 66 is cylindrical in shape however other shapes can be utilized, e.g., such as ribbons or sheet shapes. The outlet 66 is located near the second end 18 of the barrel 12 and at least a portion thereof is preferably generally parallel to the first and second inlets 32, 36, however the outlet 66 extends in a direction opposite the first and second inlets 32, 36.

As shown in FIGS. 1–5, a method of using the in-line compounding/extrusion deposition compression molding apparatus 10 will now be described in greater detail. The present invention provides a process for preparing the moldable fiber filled melt 64. The fiber filled melt 64 is produced from the mixing of the melted inlet material 34 and the sheared reinforcing fibers 60. Molded structures that are reinforced with long reinforcing fibers have mechanical properties superior to those structures reinforced with short fibers. To enjoy the benefits of superior mechanical properties, the process of this invention allows for a long reinforcing fiber to be maintained without breakage and therefore cut at a longer length than was previously possible in a single step process. In the process, the apparatus 10 of the present invention mixes the longer cut reinforcing fiber bundles 44 with the melted inlet material 34 before deposition in a tool 70. As shown in FIG. 1, the apparatus 10 and more specifically the barrel 12 and the die 22 are in a first position relative to the winding/unwinding reels 46 and the tool 70. In the first position, the die 22 is not axially aligned with the tool 70 but rather the barrel 12 and the die 22 are off set therefrom.

In the exemplary and illustrated embodiment in the first position, the second inlet 36 is generally axially aligned with a centermost winding/unwinding reel 46. In the first position, the screw 24 generally is disposed within the barrel 12 so that the head 30 is adjacent to or abuts the complementary beveled portion 19 of the barrel 12. The beveled portion 19 comprises an annular beveled surface which has a complementary shape as the head 30 so that the beveled portion 19 acts as a stop for the screw 24. It being understood that the illustrated embodiment shown in the Figures is merely exemplary in nature and the present invention is not limited to the illustrated embodiment. In the first position, the apparatus 10 is stationary and the reinforcing fiber bundles 44 are disposed within the winding/unwinding reel 46 and extend through the second inlet 36 into the internal cavity 14 so that the reinforcing fiber bundles 44 contact the screw 24 before operation of the apparatus 10.

Figure 2:
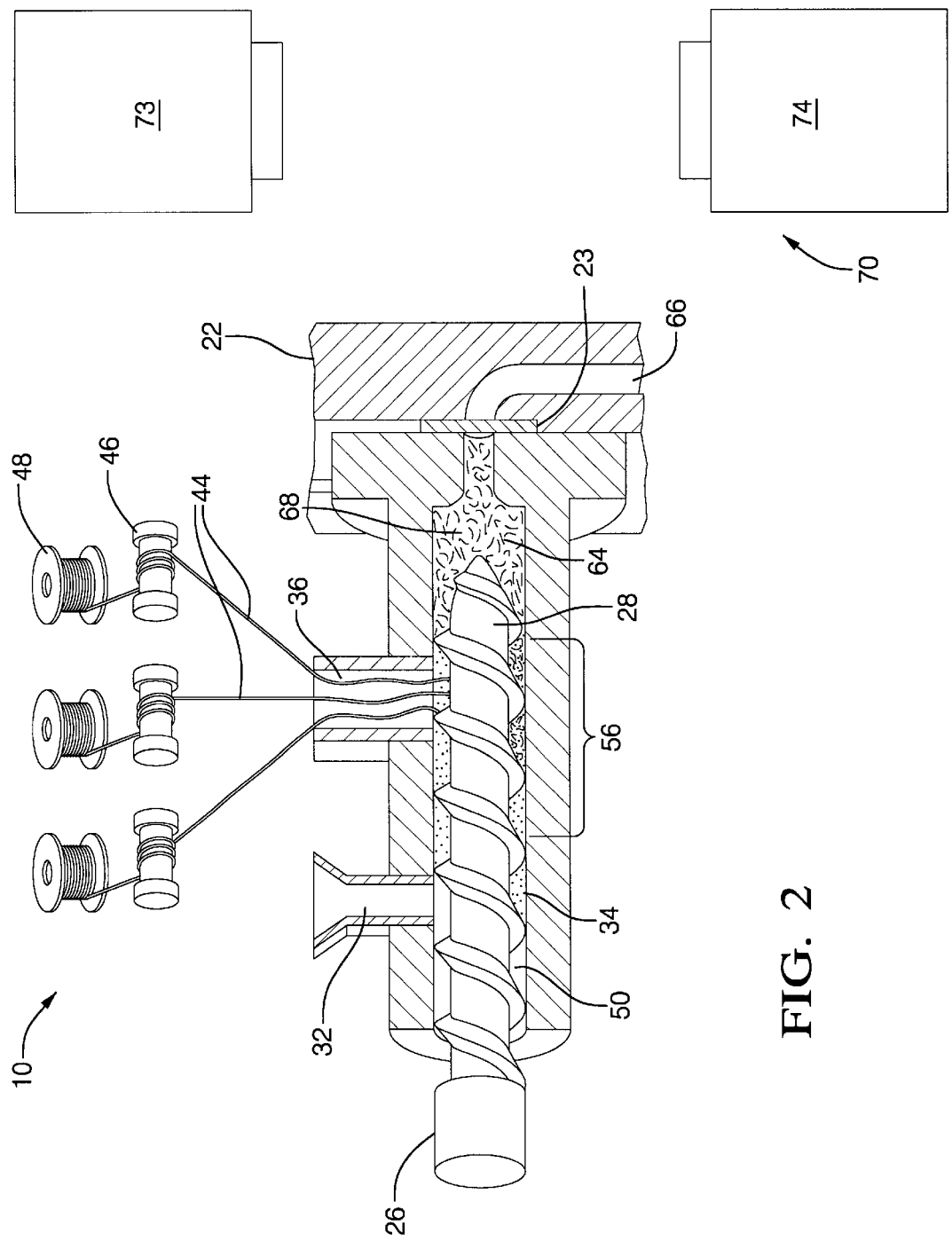
FIG. 2 is a cross-sectional side view of the apparatus of FIG. 1 in a second position.

As shown in FIG. 2, the process begins by rotating the screw 24 located inside the internal cavity 14 of the barrel 12. Preferably, a beginning rotation speed would be dependant on the type of inlet material 34 and the amount of the cut reinforcing fibers 60 in the final compound. Not shown is the means by which the rotation of screw 24 is accomplished. Any conventional means for rotation can be utilized. Simultaneously, the inlet material 34 is fed under compression into the internal cavity 14 of the barrel 12. The melting of the inlet material 34 is achieved in the first zone 52 of the apparatus 10. The first zone 52 is where the first operation of the apparatus is preformed. Preferably the inlet material 34 is fed under a high compression ratio, up to about 8:1 for the rapid melting of the inlet material 34. The flight depth in the first zone 52 rapidly transitions from a deep flight depth to a shallow flight depth within the first zone 52.

As the inlet material 34 is melted, the screw 24 rotation continuously feeds the reinforcing fiber bundles 44 into the second zone 56. The reinforcing fiber bundles 44 are fed into the second zone 56 through the guide 42 from the series of winding/unwinding reels 46 which work in connection with the movement of the apparatus 10 to keep the reinforcing fiber bundles 44 in a constant taut state. The screw 24 preferably has a free flowing check valve to prevent unintentional reinforcing fiber bundles 44 breakage. The reinforcing fiber bundles 44 are thus introduced into the apparatus 10 after the inlet material 34 has been melted in the first zone 52 due to the rotation of the screw 24. Thus, the plastication process begins prior to the introduction of the reinforcing fiber bundles 44 into the internal cavity 14 so that melted inlet material 34 is advanced into the second zone 56 for combination with the reinforcing fiber bundles 44. Rotation of the winding/unwinding reels 46 is controlled based on the apparatus 10 location during operation. The movement of the winding/unwinding reels 46 can be generated by a servo-driven motor with closed loop control or by pretension created by spring loading the reel 46 or any other known mechanical means. When closed loop control is chosen as the mechanism, the servo-driven motor either unwinds or winds the reinforcing fiber bundles 44 depending upon the relative position of the apparatus 10. Prior to moving into the second zone 56, the reinforcing fiber bundles 44 can be preheated to a temperature at or above the plastic melt temperature of the inlet material 34 to improve melt mixing and homogenization that takes place in the third zone 62. A higher melt temperature allows for better wetting of the reinforcing fiber bundles 44 by the melted inlet material 34.

The rotation of the screw 24 continuously feeds the reinforcing fiber bundles 44 into the internal cavity 14 at the second zone 56 and as the reinforcing fiber bundles 44 enter the second zone 56, the reinforcing fiber bundles 44 are unwound from the winding/unwinding reels 46 keeping the reinforcing fiber bundles 44 stretched. Once in the second zone 56, the filaments of the reinforcing fiber bundles 44 are opened for improved wetting and the stretched reinforcing fiber bundles 44 are sheared or broken to a desirable longer length. Shearing is achieved, for example, by increasing the tensile load on the reinforcing fiber bundles 44 and when the resistance becomes too great, the reinforcing fiber bundles 44 shear forming the sheared reinforcing fibers 60. As the inlet material 34 is melted and the reinforcing fiber bundles 44 sheared, the apparatus 10 is stationary, as best shown in FIG. 2.

As the reinforcing fiber bundles 44 are sheared in the second zone 56, the melted inlet material 34 begins to mix with the cut reinforcing fibers 60 to create a fiber filled melt 64. Continued mixing occurs as the fiber filled melt 64 is advanced into the third zone 62 by the rotation of the plurality of flights 25. The third zone 62 accomplishes the uniform distributive mixing and impregnation of the sheared reinforcing fibers 60 with the melted inlet material 34 to form the fiber filled melt 64. As the fiber filled melt 64 accumulates, it is advanced into an accumulation zone, generally indicated at 68 because the plurality of flights 25 continues to advance the fiber filled melt 64. The accumulation zone 68 is that area between the head 30 of the screw 24 and the blade 23. As can be appreciated the accumulation zone 68 increases as the screw 24 retracts in a direction away from the blade 23. The screw 24 retracts based on its back pressure setting and the retraction occurs as more and more fiber filled melt 64 builds up in the accumulation zone 68. Accumulation of the fiber filled melt 64 occurs until enough is gathered to create a shot size having a predetermined size. Because the blade 23 is in a closed position, the fiber filled melt 64 continues to build between the head 30 and the blade 23 and this build-up causes the back pressure which drives the screw 24 in a direction away from the blade 23. As shown in FIG. 2, the screw 24 assumes a second retracted position in which the screw 24 has been driven in a direction away from the blade 23 to accommodate the fiber filled melt 64 between the head 30 and the blade 23.

Figure 3:
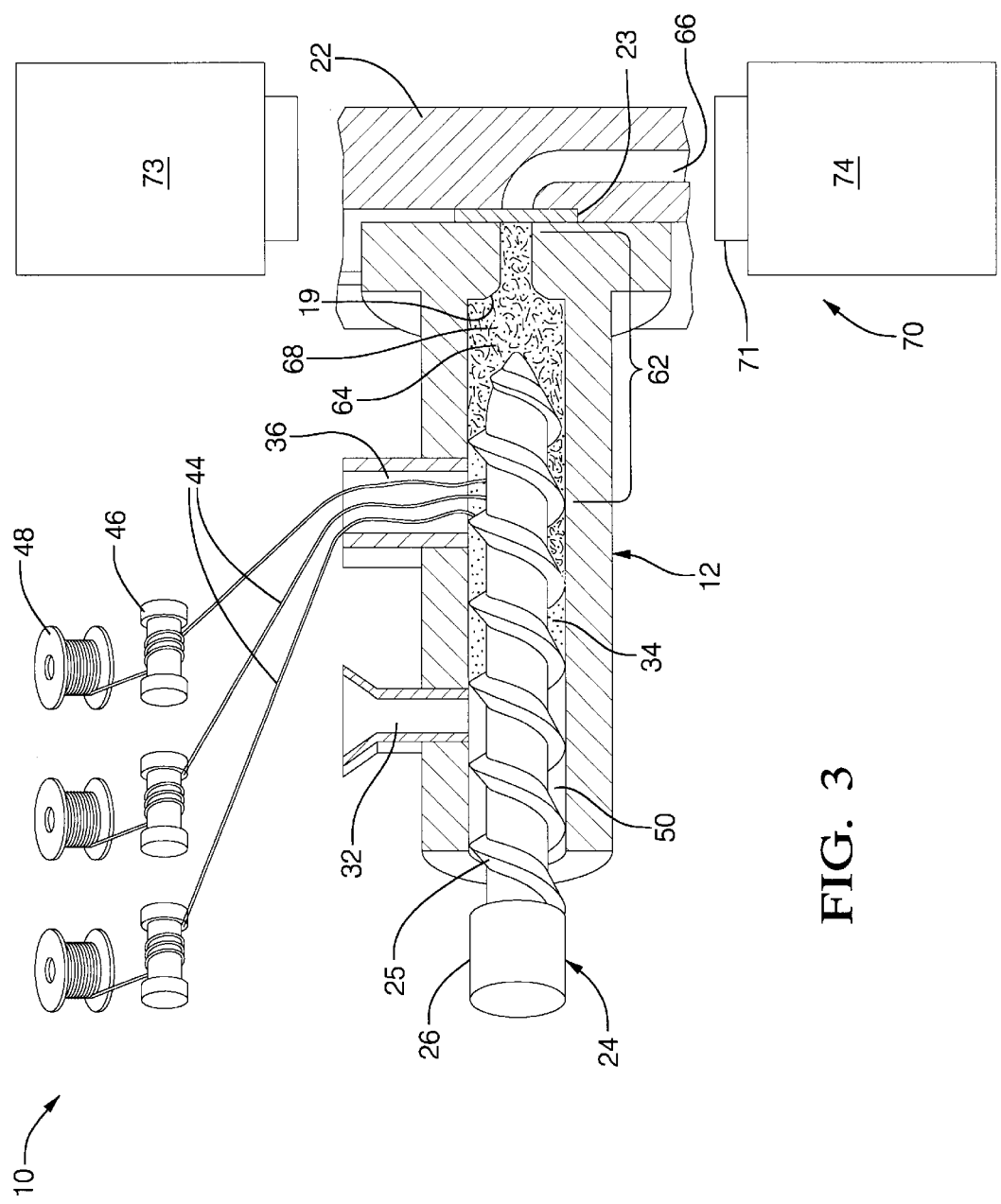
FIG. 3 is a cross-sectional side elevational view of the apparatus of FIG. 1 in a third position.

As shown in FIG. 3, once the proper shot size is detected, the apparatus 10 moves in a direction towards the tool 70. An exemplary tool 70 comprises a press 73 with a mold 74. As mentioned above the apparatus 10 is moved by known means. Because the winding/unwinding reels 46 and spools 48 are preferably stationary relative to the barrel 12 and die 22, the movement of the barrel 12 and die 22 in the direction towards the tool 70 causes the winding/unwinding reels 46 to unwind to release an appropriate length of each of the reinforcing fiber bundles 44 to accommodate the movement of the barrel 12 and the die 22. This results because even in the stage shown in FIG. 3, the reinforcing fiber bundles 44 are fed into the second inlet 36 and communicate with the internal cavity 14 and the screw 24 disposed therein so that ends of the reinforcing fiber bundles 44 are not free but rather are secured within the internal cavity 14 so that it is taut (under tension). Thus, the movement of the barrel 12 and the die 22 towards the tool 70 results in the reinforcing fiber bundles 44 being angled relative to the barrel 12 so that the reinforcing fiber bundles 44 feed through the guide 42 and into the second inlet 36 as shown in FIG. 3.

Once the apparatus 10 reaches an edge 71 of the tool 70, the blade 23 in the die 22 opens and the screw 24 moves forward forcing the fiber filled melt 64 out through the outlet 66 and deposits the fiber filled melt 64 as the apparatus 10 moves as programmed to distribute the fiber filled melt 64 over the mold 74. Because the apparatus 10 is capable of moving in three dimensions X, Y, and Z, the apparatus 10 is capable of distributing the fiber filled melt 64 by moving in the programmed X, Y, and Z directions to evenly distribute the fiber filled melt 64 in the mold 74. Because movement of the barrel 12 or screw 24 effects the existing tension of the reinforcing fiber bundles 44, the winding/unwinding reels 46 are designed to either wind or unwind the reinforcing fiber bundles 44 so that sagging and breakage of the reinforcing fiber bundles 44 are prevented. As shown in FIG. 3, the winding/unwinding reels 46 unwind the reinforcing fiber bundles 44 with constant tension to permit movement of the barrel 12 and die 22 towards the tool 70. In this deposition stage, the screw 24 is driven towards the beveled surface 19 to once again assume the first position and cause the fiber filled melt 64 to be displaced through the central opening 31 and into the outlet 66 of the die 22 where the fiber filled melt 64 is then directed into the mold 74.

Figure 4:
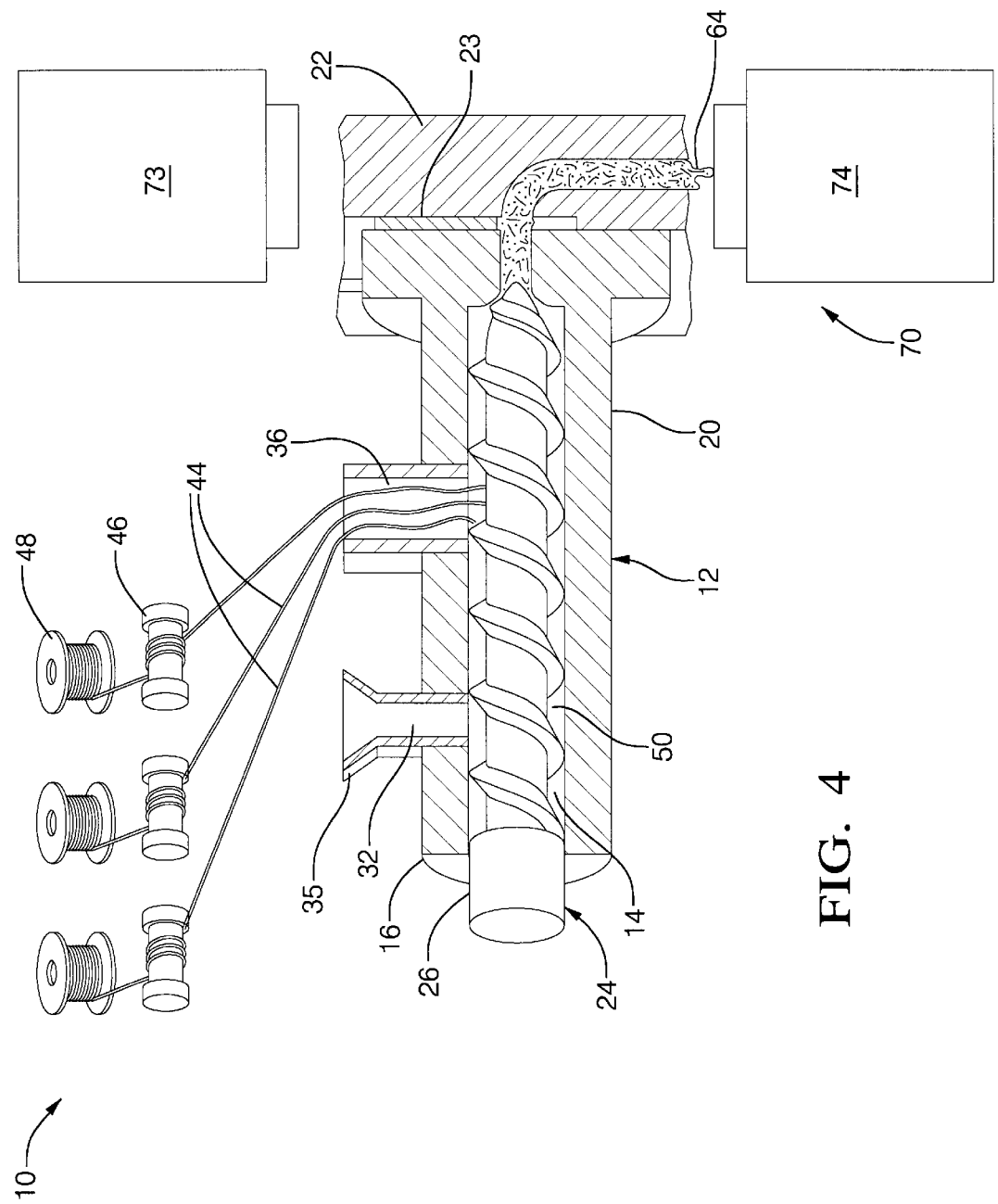
FIG. 4 is a cross-sectional side elevational view of the apparatus of FIG. 1 in a fourth position.
Figure 5:
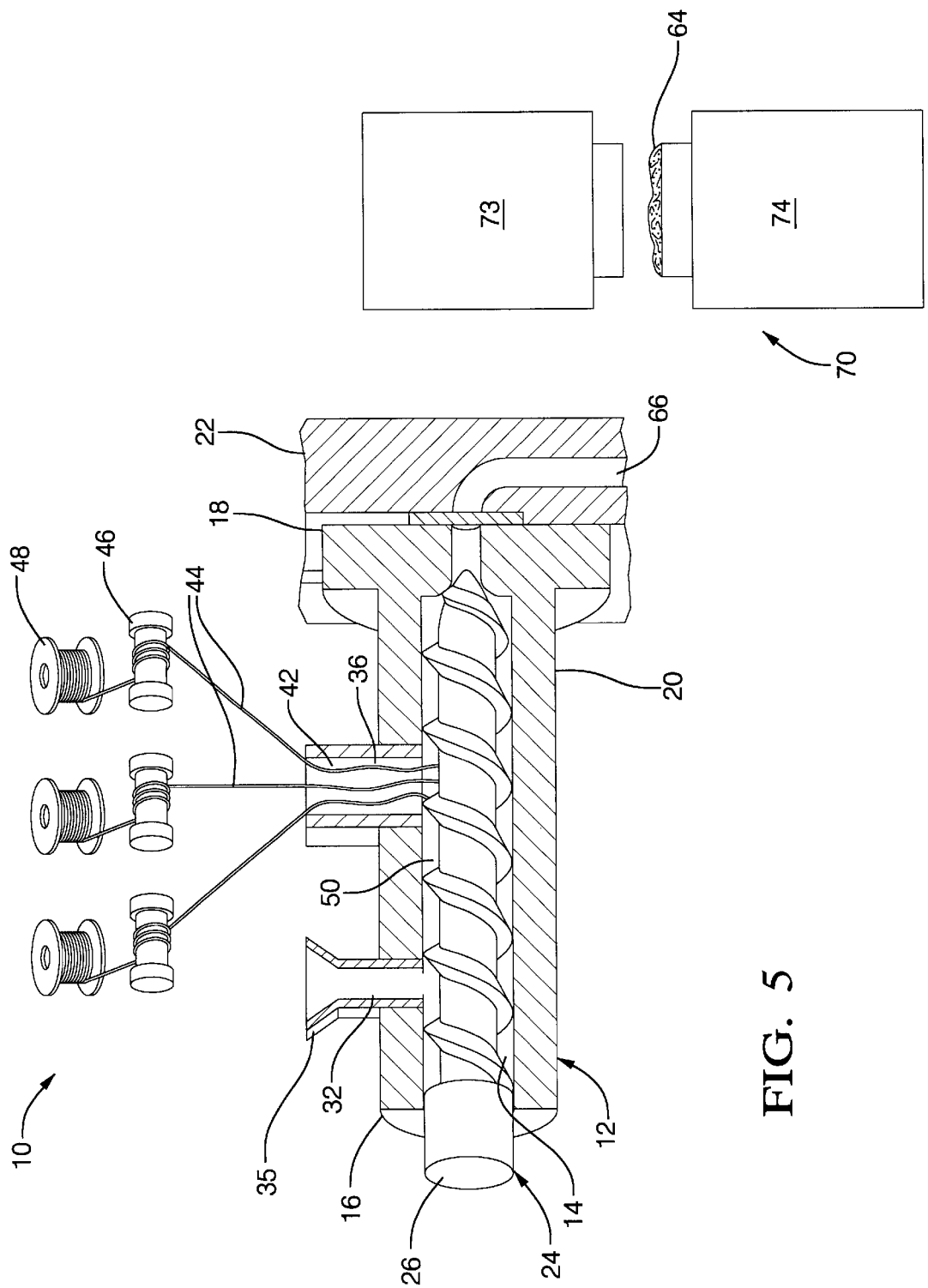
FIG. 5 is a cross-sectional side elevational view of the apparatus of FIG. 1 in a fifth position.

Referring now to FIGS. 4 and 5. FIG. 4 illustrates the apparatus 10 as the fiber filled melt 64 is deposited onto the mold 74. Once the apparatus 10 is properly positioned, the blade 23 is opened so that the fiber filled melt 64 may be deposited onto the mold 74. After the fiber filled melt 64 is deposited onto the mold 74, the press 73 is driven so as to close the tool 70 and compress, thereby forming the desired part by a compression molding technique. As shown in FIG. 5, after the fiber filled melt 64 is deposited and prior to the press 73 being driven towards the mold 74, the barrel 12 and the die 22 move back to the first position illustrated generally in FIG. 1. At this time, the blade 23 is repositioned to the closed position so that the process may be repeated. When the barrel 12 and the die 22 move back the first position, the reinforcing fiber bundles 44 are wound up by the winding/unwinding reels 46 so as to take up the potential slack which would be created by returning the barrel 12 and die 22 to the original first position. Because the winding/unwinding reels 46 are preferably spring loaded, the reinforcing fiber bundles 44 are not permitted to sag but rather remain under constant tension as the barrel 12 and the die 22 move either in the direction towards the tool 70 or in the direction away from the tool 70. This movement of the barrel 12 and the die 22 also likewise permits the press 73 to be driven towards and contact the mold 74 to produce the compressed formed part. Once the formed part cools, the tool 70 is opened and the molded fiber filled part is removed.

The present invention advantageously provides apparatus 10 and process for in-line compounding of reinforcing fiber bundles 44 and molding 34 in a single step process. The exemplary apparatus 10 compounds a reinforcing product by use of the reciprocating single screw 24 having a reinforcing fiber compounder and melt depositing unit. According to the present invention, the reinforcing fiber bundles 44 are severed at a maximum desirable length and are maintained in a stretched tensioned condition regardless of the positioning of apparatus 10 such that the reinforcing fiber bundles 44 are not loose and does not sag during the process. By using a single-step process for the in-line compounding of reinforcing fibers and extrusion compression molding, the present invention offers a more cost effective method of producing a higher quality part because a single apparatus is used instead of the multiple part assemblies used conventionally. Additionally, the present invention incorporates the reinforcing fiber bundles 44 into the reciprocating single screw injection unit and severs and uniformly impregnates the fine filaments with resin keeping maximum fiber length in the manufactured product. Due to the longer reinforcing fiber retention in the manufactured product, a higher strength product can be produced.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A process for in-line compounding of a reinforcing fiber bundle with extrusion compression molding using an in-line compounding/extrusion deposition and molding apparatus, the process comprising:

providing a first material to a first inlet formed in the apparatus, the first inlet being in fluid communication with ail internal cavity of the apparatus, the internal cavity having a single rotatable extruder screw, the first material being fed into a first zone of the internal cavity;

providing at least one reinforcing fiber bundle to a second inlet formed in the apparatus, the at least one reinforcing fiber bundle being fed into a second zone of the internal cavity under a predetermined constant tension to prevent slack in the at least one reinforcing fiber bundle;

rotating the single rotatable extruder screw so as to melt the first material in the first zone prior to advancing the melted first material to the second zone, the rotation of the single rotatable extruder screw causing the at least one reinforcing fiber bundle to be fed into the second zone under the predetermined constant tension;

shearing the at least one reinforcing fiber bundle in the second zone;

mixing the sheared at least one reinforcing fiber bundle and the melted first material in a third zone to produce a fiber bundle filled melt;

retracting the single rotatable extruder screw to permit expansion of a fourth zone, wherein the fiber filled melt accumulates in the fourth zone thereby forming a shot; and directing the fiber bundle filled melt through an outlet formed in the apparatus by movement of the single rotatable extruder screw in a direction toward the outlet.

2. The process according to claim 1, wherein the first material comprises a material selected from the group consisting of thermoplastic materials and thermoset materials.

3. The process according to claim 1, wherein providing at least one reinforcing fiber bundle to the second inlet comprises:

unwinding the at least one reinforcing fiber bundle from a spool;

and maintaining the predetermined tension by passing the at least one reinforcing fiber bundle over a winding/unwinding reel so that the at least one reinforcing fiber bundle is under constant tension as the at least one reinforcing fiber bundle is fed into the second zone.

4. The process according to claim 3, wherein the winding/unwinding reel is spring loaded so that slack in the at least one reinforcing fiber bundle is prevented during operation of the apparatus and the tensile load on the at least one reinforcing fiber bundle is maintained below the predetermined value.

5. The process according to claim 1, wherein shearing the at least one reinforcing fiber bundle comprises placing a tensile load on the at least reinforcing fiber bundle so that the tensile load exceeds a predetermined value and causes the at least one reinforcing fiber bundle to shear.

6. The process according to claim 1, wherein the single rotatable extruder screw has a first compression ratio in the first zone to cause the inlet material to rapidly melt in the first zone prior to the melted first material being advanced into the second zone.

7. The process according to claim 6, wherein the first compression ratio is from about 3.5:1 to about 8:1.

8. The process according to claim 1, wherein the second zone includes a second compression ratio, wherein the second compression ratio is constant in the second zone.

9. The process according to claim 1, further including:

moving the apparatus to a predetermined mold position prior to directing the fiber bundle filled melt from the outlet.

10. The process according to claim 9, wherein moving the apparatus comprises moving the apparatus in at least one direction of a three dimensional area.

11. A process for in-line manufacturing of a fiber reinforced molded structure, the process comprising:

feeding a first material into a first inlet of an apparatus, said first inlet being in fluid communication with an internal cavity of said apparatus;

advancing said first material from said first inlet to a second inlet of said apparatus by rotating a single extruder screw within said internal cavity such that said first material is melted, said second inlet being in fluid communication with said internal cavity;

feeding reinforcing fiber under a predetermined tension into said second inlet by rotating said single extruder screw within said internal cavity such that a fiber filled melt is formed from said first material and said reinforcing fiber;

advancing said fiber filled melt from said second inlet to an outlet of said internal cavity by rotating said single extruder screw within said internal cavity;

accumulating a shot of said fiber filled melt at said outlet by moving said single extruder screw from a first position to a second position;

distributing s aid shot on a mold by opening s aid outlet, moving said single extruder screw from said second position to said first position, and moving said outlet with respect to said mold; and closing said mold to form the fiber reinforced molded structure from said shot.

12. The process as in claim 11, wherein said inlet material comprises material selected from the group consisting of thermoplastic materials and thermoset materials.

13. The process as in claim 12, wherein said reinforcing is selected from the group consisting of glass fibers, natural fibers, polyaramid fibers, and carbon fibers.

14. The process as in claim 11, wherein moving said outlet with respect to said mold further comprises:

moving said apparatus in at least one direction of a three dimensional area.

15. The process as in claim 11, wherein feeding said reinforcing fiber under said predetermined tension comprises:

unwinding said reinforcing fiber from a spool; and maintaining said predetermined tension by passing said reinforcing fiber over a winding/unwinding reel so that said reinforcing fiber is under said predetermined tension as said reinforcing fiber is fed into said second inlet.

16. The process as in claim 15, wherein said predetermined tension prevents sagging and premature shearing of said reinforcing fiber.

* * * * *